United States Patent
Cho et al.

(10) Patent No.: US 9,851,057 B2
(45) Date of Patent: Dec. 26, 2017

(54) LIGHTING DEVICE

(71) Applicant: LG INNOTEK CO., LTD., Seoul (KR)

(72) Inventors: Shin Cho, Seoul (KR); Jung Tae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/127,653

(22) PCT Filed: Mar. 13, 2015

(86) PCT No.: PCT/KR2015/002448
§ 371 (c)(1),
(2) Date: Sep. 20, 2016

(87) PCT Pub. No.: WO2015/141989
PCT Pub. Date: Sep. 24, 2015

(65) Prior Publication Data
US 2017/0130907 A1 May 11, 2017

(30) Foreign Application Priority Data
Mar. 20, 2014 (KR) .......................... 10-2014-0032675

(51) Int. Cl.
*H05B 37/02* (2006.01)
*F21K 9/238* (2016.01)
(Continued)

(52) U.S. Cl.
CPC .............. *F21K 9/238* (2016.08); *F21K 9/232* (2016.08); *F21K 9/237* (2016.08); *F21K 9/64* (2016.08);
(Continued)

(58) Field of Classification Search
CPC . F21K 9/64; F21K 9/232; F21K 9/237; F21K 9/238; F21V 3/02; F21V 5/04;
(Continued)

(56) References Cited

U.S. PATENT DOCUMENTS 7,521,872 B2 * 4/2009 Bruning ............. H05B 33/0821
    315/149
8,633,646 B2 * 1/2014 Molezion ............... H01Q 1/007
    315/307
(Continued)

FOREIGN PATENT DOCUMENTS

JP    2011-228130 A    11/2011
KR    10-2010-0058077 A    6/2010
(Continued)

OTHER PUBLICATIONS

International Search Report, issued in PCT/KR2015/002448 (PCT/ISA/210), dated Jun. 29, 2015.

*Primary Examiner* — Alexander H Taningco
*Assistant Examiner* — Kurtis R Bahr
(74) *Attorney, Agent, or Firm* — Birch, Stewart, Kolasch & Birch, LLP (57) ABSTRACT

A lighting device according to an embodiment of the present invention comprises: a heat dissipating frame having a receiving recess formed therein and a plurality of insertion holes formed in the upper surface thereof; a light source module mounted on an upper surface of the heat dissipating frame, and including a first substrate in which a plurality of coupling holes is formed at positions facing the plurality of insertion holes; and a control module received in the receiving recess of the heat dissipating frame, and including a second substrate having a plurality of connecting terminals formed on a side surface thereof and projecting in a lengthwise direction, wherein the control module is disposed vertically upright within the receiving recess such that the plurality of connecting terminals faces upward, and the plurality of connecting terminals is inserted in the plurality of insertion holes and the plurality of coupling holes is connected to the light source module.

8 Claims, 7 Drawing Sheets

(51) Int. Cl.
*F21V 23/00* (2015.01)
*F21K 9/232* (2016.01)
*F21V 29/77* (2015.01)
*F21K 9/64* (2016.01)
*F21K 9/237* (2016.01)
*F21V 3/02* (2006.01)
*F21V 5/04* (2006.01)
*F21V 9/16* (2006.01)
*H05B 33/08* (2006.01)
*F21Y 115/10* (2016.01)
*F21V 3/04* (2006.01)

(52) U.S. Cl.
CPC ................. *F21V 3/02* (2013.01); *F21V 5/04* (2013.01); *F21V 9/16* (2013.01); *F21V 23/006* (2013.01); *F21V 29/77* (2015.01); *H05B 33/0809* (2013.01); *H05B 33/0845* (2013.01); *H05B 37/0272* (2013.01); *F21V 3/049* (2013.01); *F21V 3/0445* (2013.01); *F21Y 2115/10* (2016.08)

(58) Field of Classification Search
CPC ........ F21V 9/16; F21V 29/77; F21Y 2115/10; H05B 33/0809; H05B 33/0845; H05B 37/0272
See application file for complete search history.

(56) References Cited

U.S. PATENT DOCUMENTS

| | | | |
|---|---|---|---|
| 9,184,497 B2* | 11/2015 | Chen | H01Q 1/38 |
| 9,404,624 B2* | 8/2016 | Chung | F21V 23/045 |
| 2007/0007898 A1 | 1/2007 | Bruning | |
| 2010/0106306 A1* | 4/2010 | Simon | H05B 33/0833 700/276 |
| 2012/0069545 A1* | 3/2012 | Choi | F21V 3/00 362/84 |
| 2012/0274208 A1 | 11/2012 | Chen et al. | |
| 2013/0249392 A1* | 9/2013 | Kim | F21V 29/004 315/34 |
| 2013/0285544 A1 | 10/2013 | Molezion | |
| 2014/0021862 A1* | 1/2014 | Chung | F21V 29/004 315/112 |
| 2015/0103515 A1* | 4/2015 | Bosua | F21V 29/83 362/157 |

FOREIGN PATENT DOCUMENTS

| | | |
|---|---|---|
| KR | 10-1248490 B1 | 4/2013 |
| KR | 10-2014-0023483 A | 2/2014 |
| WO | WO 2010/140136 A1 | 12/2010 |

* cited by examiner

FIG. 10

LIGHTING DEVICE

CROSS REFERENCE TO RELATED APPLICATIONS

This application is the National Phase of PCT International Application No. PCT/KR2015/002448, filed on Mar. 13, 2015, which claims priority under 35 U.S.C. 119(a) to Patent Application No. 10-214-0032675, filed in Republic of Korea on Mar. 20, 2014, all of which are hereby expressly incorporated by reference into the present application.

TECHNICAL FIELD

Embodiments relate to a lighting device having a wireless communication function.

BACKGROUND

Generally, lighting devices are provided in various forms, e.g., a ceiling-direct-attached lamp, a landscape lighting lamp, a night lamp, a desk lamp, etc., according to purposes thereof. These lighting devices need to be turned on with sufficient brightness levels according to the purposes thereof. Thus, recent lighting devices use light emitting diodes (LEDs). The LEDs have advantages such as low power consumption, a semi-permanent lifespan, a fast response time, high stability, and environmental friendliness, as compared with the existing light sources, e.g., fluorescent lamps and incandescent lamps. In this regard, research has been conducted to replace LEDs used as the existing light source.

However, such a lighting device is turned on or off by a switch connected via a wire. Therefore, it is inconvenient for a user of a lighting device to control the lighting device.

DISCLOSURE OF THE INVENTION

Technical Problem

Embodiments of the present invention provide a lighting device which can be easily controlled.

Embodiments of the present invention also provide a lighting device in which a lower substrate and an upper substrate are directly connected to each other without additional connection members.

Embodiments of the present invention also provide a lighting device in which a ground pattern of an element performing a communication function is separated and insulated from a ground pattern of an element which performs a supply of power or a power control function, thereby minimizing interference occurring between the communication function and the power supply function.

Technical problems to be achieved in embodiments set forth herein are not limited to the above-mentioned technical problems, and other technical problems will be fully understood from the following description by those skilled in the art to which the embodiments pertain.

Technical Solution

In one embodiment, a lighting device includes: a heat dissipating frame having a receiving recess formed therein and a plurality of insertion holes formed in an upper surface thereof; a light source module disposed on the upper surface of the heat dissipating frame, and including a first substrate in which a plurality of coupling holes is formed at positions facing the plurality of insertion holes; and a control module received in the receiving recess of the heat dissipating frame, and including a second substrate having a plurality of connecting terminals formed on a side surface thereof and projecting in a lengthwise direction, wherein the control module is disposed vertically upright within the receiving recess such that the plurality of connecting terminals faces upward, and the plurality of connecting terminals is inserted in the plurality of insertion holes and the plurality of coupling holes and is connected to the light source module.

The control module includes: a power supply element attached on the second substrate; and a communication element attached on the second substrate, and the power supply element and the communication element are respectively connected to at least one connecting terminal among the plurality of connecting terminals.

The lighting device further includes, on the second substrate: a first ground pattern for ground of the power supply element; and a second ground pattern insulated from the first ground pattern for ground of the communication element, wherein the first and second ground patterns are respectively connected to at least one connecting terminal among the plurality of connecting terminals.

The light source module includes: at least one light source attached on the first substrate; a light source control element attached on the first substrate to control the at least one light source; and an antenna printed on the first substrate to receive a wireless control signal transmitted from the outside, and the light source, the light source control element, and the antenna are respectively connected to at least one connecting terminal among the plurality of connecting terminals inserted in the plurality of coupling holes.

The plurality of connecting terminals includes an antenna connecting terminal connected to an antenna formed on the first substrate and a communication element attached on the second substrate and transmitting a wireless control signal received through the antenna to the communication element.

The antenna connecting terminal is arranged in an outermost region among the plurality of connecting terminals.

The light source module includes: a third ground pattern formed on the first substrate for ground of the light source control element and the light source; and a fourth ground pattern formed on the first substrate to be insulated from the third ground pattern for ground of the antenna, and the plurality of connecting terminals further includes a first ground connecting terminal which mutually connects the second ground pattern formed on the second substrate and the fourth ground pattern formed on the first substrate.

The first ground connecting terminal is arranged adjacent to the antenna connecting terminal arranged at the outermost region.

The plurality of connecting terminals further includes a second ground connecting terminal which mutually connects the first ground pattern formed on the second substrate and the third ground pattern formed on the first substrate.

The plurality of connecting terminals includes at least one of: a power control signal terminal through which a power control signal of the light source supplied through the communication element attached on the second substrate is transferred to the light source control element attached on the first substrate; a dimming control signal terminal through which a dimming control signal of the light source supplied through the communication element attached on the second substrate is transferred to the light source control element attached on the first substrate; and a power supply terminal through which driving power supplied through the power supply element attached on the second substrate is transferred to the light source attached on the first substrate.

The light source module further includes a plurality of pads formed around the plurality of coupling holes of the first substrate, and the plurality of connecting terminals is electrically connected to the plurality of pads by adhesive members respectively formed on the plurality of pads, in a state of being inserted into the plurality of coupling holes.

In another embodiment, a lighting device includes: a light distribution cover configured to emit light; a heat dissipating frame coupled to a lower periphery of the light distribution cover and having a receiving recess in a flat upper surface and an inner surface thereof; a light source module arranged on the upper surface of the heat dissipating frame; an inner case received in a receiving recess of the heat dissipating frame; a control module connected to the inside of the inner case and electrically connected to the light source module; and a socket part connected to a lower portion of the heat dissipating frame to supply power to the control module, the light source module includes: a first substrate; at least one light source attached on the first substrate; a light source control element attached on the first substrate; an antenna printed on the first substrate; a first ground pattern formed on the first substrate for ground of the light source and the light source control element; and a second ground pattern insulated from the first ground pattern and formed on the first substrate for ground of the antenna, the control module includes: a second substrate; a power supply element attached on the second substrate and connected to the socket part; a communication element attached on the second substrate; a third ground pattern formed on the second substrate for ground of the power supply element; and a fourth ground pattern insulated from the third ground pattern and formed on the second substrate for ground of the communication element, the first ground pattern is connected to the third ground pattern, and the second ground pattern is connected to the fourth ground pattern.

The control module includes a plurality of connecting terminals formed on a side surface of the second substrate and projecting in a lengthwise direction, and the plurality of connecting terminals includes: a first connecting terminal connecting the first ground pattern to the third ground pattern; and a second connecting terminal connecting the second ground pattern to the fourth ground pattern.

A plurality of insertion holes is formed on an upper surface of the heat dissipating frame, a plurality of coupling holes is formed at positions corresponding to the plurality of insertion holes on the first substrate of the first light source module, and the control module is disposed vertically upright within the inner case such that the plurality of connecting terminals faces upward, and the plurality of connecting terminals is inserted into the plurality of insertion holes and the plurality of coupling holes.

The plurality of connecting terminals includes at least one of: an antenna connecting terminal connected to an antenna formed on the first substrate and a communication element attached on the second substrate such that a wireless control signal received through the antenna is transferred to the communication element; a power control signal terminal through which a power control signal of the light source supplied through the communication element attached on the second substrate is transferred to the light source control element attached on the first substrate; a dimming control signal terminal through which a dimming control signal of the light source supplied through the communication element attached on the second substrate is transferred to the light source control element attached on the first substrate; and a power supply terminal through which driving power supplied through the power supply element attached on the second substrate is transferred to the light source attached on the first substrate.

ADVANTAGEOUS EFFECTS

Since a lighting device according to an embodiment of the present invention can receive a wireless control signal through an antenna and control a light source according to a wireless control signal, a wireless control of the lighting device can be achieved, thereby improving convenience of a user of the lighting device.

Also, in an embodiment of the present invention, an upper substrate and a lower substrate can be connected to each other, without additional connection members, by forming holes on pads connected to various elements in the upper substrate and inserting terminals formed in the lower substrate into the formed holes. Therefore, a signal transmission is performed in a shortest distance, thereby minimizing signal loss.

Also, in an embodiment of the present invention, a ground pattern of a communication element which performs a communication function is separated and insulated from a ground pattern of a power supply element which performs a supply of power or a power control function, thereby minimizing interference occurring between the communication function and the power supply function.

MODE FOR CARRYING OUT THE INVENTION

The embodiments of the present invention will be described with reference to the accompanying drawings in such a manner that the embodiments may be easily carried out by those skilled in the art to which the present invention pertains. However, the present invention may be implemented in various forms and is not limited to the embodiments.

It will also be understood that the terms "comprises", "includes", and "has", when used herein, specify the presence of stated elements, but do not preclude the presence or addition of other elements, unless otherwise defined.

For clarity of description, parts having no relation to description are omitted. Thicknesses of layers and regions are exaggerated for clarity. Like reference numerals are assigned to like elements throughout the present disclosure and the drawings.

It will be understood that when a layer, film, region, or plate is referred to as being "formed on" another layer, film, region, or plate, it can be directly or indirectly formed on the other layer, film, region, or plate. That is, for example, intervening layers, films, regions, or plates may be present. In contrast, when a layer, film, region, or plate is referred to as being "formed directly on" another layer, film, region, or plate, it means that no intervening layers, films, regions, or plates are not present.

Hereinafter, embodiments of the present invention will be described in detail with reference to the accompanying drawings.

Figure 1:
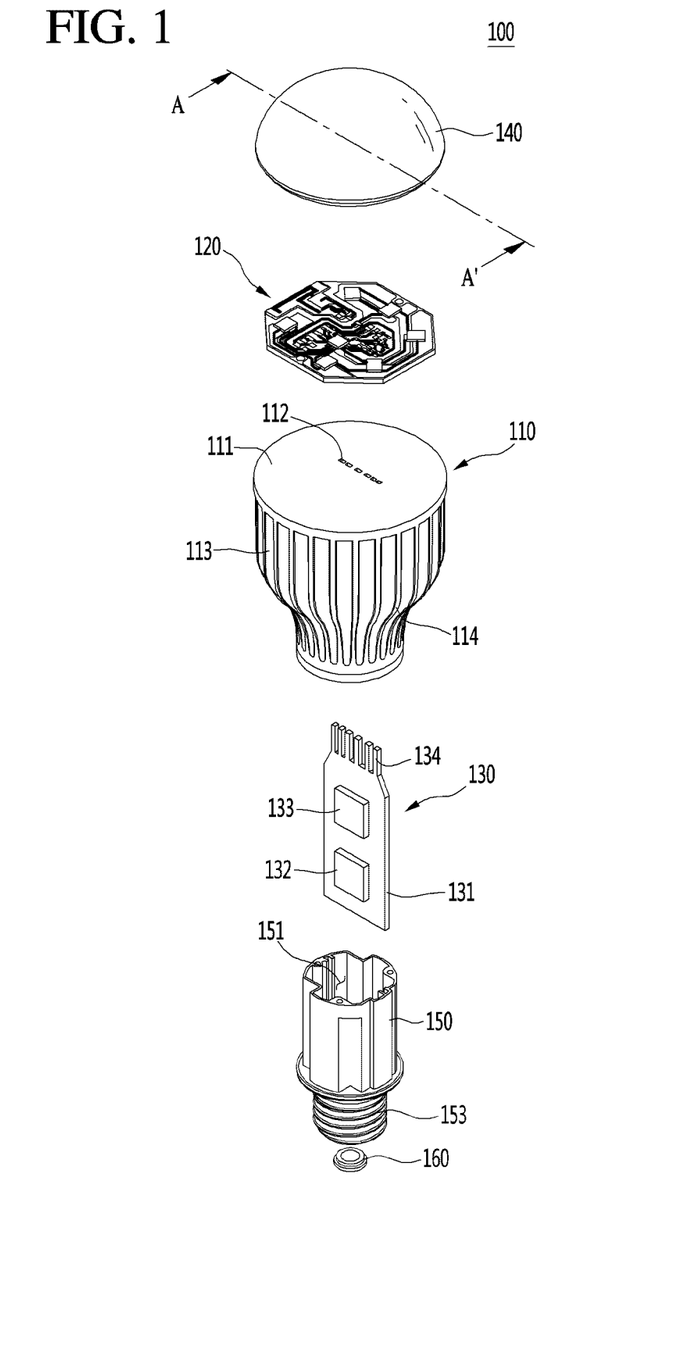
FIG. 1 is an exploded perspective view of a lighting device according to an embodiment of the present invention.
Figure 2:
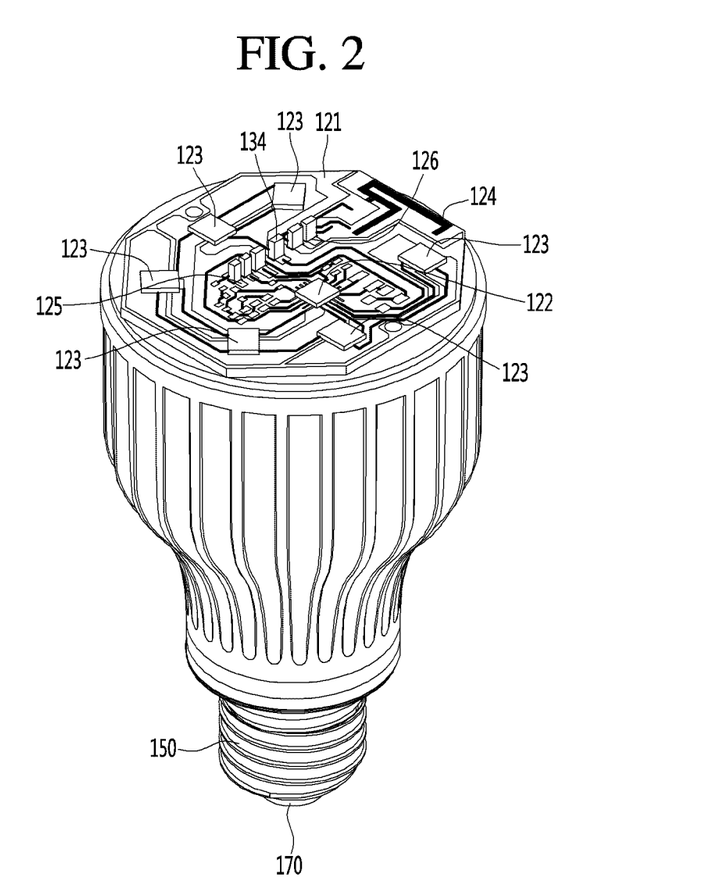
FIG. 2 is a perspective view illustrating an assembled structure of the lighting device according to an embodiment of the present invention.

FIG. 1 is an exploded perspective view of a lighting device according to an embodiment of the present invention, and FIG. 2 is a perspective view illustrating an assembled structure of the light device according to an embodiment of the present invention.

The lighting device 100 includes a heat dissipating frame 110, a light source module 120, a control module 130, a light distribution cover 140, an inner case 150, and a feeding cover 160.

The heat dissipating frame 110 receives the control module 130 and the inner case 150. A receiving recess (not illustrated) is formed inside the heat dissipating frame 110.

That is, the heat dissipating frame 110 receives the control module 130 and the inner case 150 through the receiving recess. The light source module 120 is mounted on an upper surface of the heat dissipating frame 110.

When the light device is driven, the heat dissipating frame 110 dissipates heat generated by the light source module 120 or the control module 130, and improves heat dissipation efficiency through surface contact with the light source module 120 as much as possible.

Also, the heat dissipating frame 110 dissipates heat generated by a light source 123 provided in the light source module 120, and protect the control module 130 from the heat generated by the light source 123. The heat dissipating frame 110 includes a first heat dissipating frame 111 and a second heat dissipating frame 113.

The first heat dissipating frame 111 is coupled to the light distribution cover 140. At this time, the first heat dissipating frame 111 is coupled to the light distribution cover 140 at an edge portion thereof. The light source module 120 is mounted on an upper portion of the first heat dissipating frame 111.

The first heat dissipating frame 111 comes into contact with the light source module 120. The first heat dissipating frame 111 transfers heat generated by the light source module 120 to the second heat dissipating frame 113. The first heat dissipating frame 111 may be formed to have a circular shape. Also, the first heat dissipating frame 111 may be formed to have a flat surface.

A plurality of insertion holes 112 is formed in the first heat dissipating frame 111 to pass through an upper surface and a lower surface of the first heat dissipating frame 111. The plurality of insertion holes 112 is disposed on the same axis as a plurality of coupling holes 126 and a plurality of connecting terminals 134. Preferably, the insertion holes 112 and the coupling holes 126, which are in a horizontally laid state, and the connecting terminals 134, which are in a vertically upright state, are disposed on the same axis.

The insertion holes 112 receive the connecting terminals 134. The connecting terminals 134 to pass through the insertion holes 112 to enable signal transmission and reception and electrical connection for power supply between the light source module 120 and the control module 130.

The insertion holes 112 expose the connecting terminals 134 of the control module 130. That is, the insertion holes 112 allow the connecting terminals 134 to project toward the coupling holes 126 of the light source module 120.

The second heat dissipating frame 113 surrounds the inner case 150. The second heat dissipating frame 113 exposes a power input terminal 153 formed in the inner case 150. That is, the second heat dissipating frame 113 surrounds the other regions except for the power input terminal 153 in the inner case 150.

The second heat dissipating frame 113 may be formed to have a cylindrical shape. The second heat dissipating frame 113 extends downward from the first heat dissipating frame 111. The second heat dissipating frame 113 dissipates heat generated by the light source 123 of the light source module 120. A diameter of the second heat dissipating frame 113 may be reduced as the second heat dissipating frame 113 extends downward along a central axis of the first heat dissipating frame 111.

The second heat dissipating frame 113 includes a plurality of heat dissipating fins 114. Due to the inclusion of the heat dissipating fins 114, a surface area of the second heat dissipating frame 113 increases. The heat dissipating fins 114 extends downward from the first heat dissipating frame 111. The heat dissipating fins 114 may be arranged radially from the central axis of the first heat dissipating frame 111. The heat dissipating fins 114 may project in a direction perpendicular to the central axis of the first heat dissipating frame 111.

The heat dissipating frame 110 may be made of a material including at least one of aluminum (Al), nickel (Ni), copper (Cu), silver (Ag), tin (Sn), and magnesium (Mg).

The light source module 120 is mounted on the upper surface of the first heat dissipating frame 111 (preferably, the upper surface of the first heat dissipating frame 111).

The light source module 120 includes a first substrate 121, a light source control element 122, the light source 123, an antenna 124, a connection pad 125, and the coupling holes 126.

The first substrate 121 is a support substrate which supports the light source control element 122, the light source 123, and the antenna 124.

The first substrate 121 may be a substrate in which a circuit pattern is printed on an insulator. For example, the first substrate 121 may include a general printed circuit board (PCB), a metal core PCB, a flexible PCB, a ceramic PCB, and the like. Also, the first substrate 121 may be made of a material which efficiently reflects light, or the surface of the first substrate 121 may have a color which effectively reflects light, for example, a white color, a silver color, or the like.

The light source control element 122, the light source 123, and the antenna 124 may be attached on the first substrate 121, or may be formed with patterns on the first substrate 121.

The lower surface of the first substrate 121 comes into surface contact with the upper surface of the heat dissipating frame 110.

That is, the upper and lower surfaces of the first substrate 121 may be mounted on the heat dissipating frame 110 in a state of being parallel to the upper surface of the heat dissipating frame 110.

The first substrate 121 and the heat dissipating frame 110 may be coupled to each other by an adhesive. Alternatively, holes, through which a coupling structure can pass, may be formed on the same vertical line of the first substrate 121 and the heat dissipating frame 110, and the first substrate 121 and the heat dissipating frame 110 may be coupled to each other by the coupling structure such as a screw inserted into the holes.

The light source control element 122 is attached on the first substrate 121.

The light source control element 122 is electrically connected to at least one of the plurality of connecting terminals included in the control module 130, and receives a light source control signal transmitted by the control module 130 through the plurality of connecting terminals.

The light source control element 122 controls a current supplied to the light source 123, based on the received light source control signal.

The light source control signal receives a first signal for on/off control of the light source 123 and a second signal for dimming control of the light source 123.

It is preferable that the light source control element 122 is an AC direct IC which controls the light source 123 by using an AC direct drive method.

At least one light source 123 is attached on the first substrate 121. The light source 123 may be provided at an edge portion of the first substrate 121.

The light source 123 generates light. The light source 123 may be a light emitting diode (LED). The light source 123 is operated by driving power $V_{AC}$ supplied by the control module 130 and brightness is controlled according to a current magnitude control through the light source control element 122.

The antenna 124 is provided on the first substrate 121. The antenna 124 receives a wireless control signal transmitted from the outside and transfers the received wireless control signal through a previously connected signal path.

The antenna 124 may be formed by patterning a conductive material on the first substrate 121. Also, the antenna 124 may be formed at an edge portion of the first substrate 121. That is, the antenna 124 is formed at an outermost region of the first substrate 121, is not affected by interference caused by operations of other components, and receives the wireless control signal transmitted from the outside.

The antenna 124 is separated from other components formed on the first substrate 121 by ground patterns. Therefore, the wireless control signal can be stably received without deterioration in transmission and reception characteristics of the wireless control signal due to other parts.

A plurality of pads 125 is formed on the first substrate 121, and the coupling holes 126 passing through the upper and lower surfaces of the first substrate 121 are formed in the plurality of pads 125.

That is, the plurality of coupling holes 126 passing through the upper and lower surfaces of the first substrate 121 is formed in the first substrate 121, and the plurality of pads 125 is respectively formed around the plurality of coupling holes 126.

The plurality of pads 125 is respectively connected to the light source control element 122, the light source 123, the antenna 124, and the ground patterns.

The plurality of pads 125 is electrically connected to the connecting terminals 134 inserted into the coupling holes 126. Accordingly, the plurality of pads 125 receives signals transferred through the connecting terminals 134 electrically connected thereto.

The coupling holes 126 are formed in a region facing the insertion holes 112 formed in the heat dissipating frame 110.

Although not illustrated, a lens may be further provided above the light source 123. The lens may be arranged above the first substrate 121 to cover the light source 123. The lens adjusts an orientation angle or a direction of light emitted by the light source 123. The lens has a semispherical shape and the inside of the lens is filled with a light-transmitting resin, such as a silicon resin or an epoxy resin, without empty space. The light-transmitting resin may include a phosphor dispersed entirely or partially.

When the light source 123 is a blue LED, the phosphor included in the light-transmitting resin of the lens may include at least one of a garnet-based phosphor (YAG, TAG), a silicate-based phosphor, a nitride-based phosphor, and an oxynitride-based phosphor. Natural light (white light) can be realized by including a yellow-based phosphor alone in the light-transmitting resin, but a green-based phosphor or a red-based phosphor may be further included so as to improve a color rendering index and reduce a color temperature.

Also, when various types of phosphors are mixed with the light-transmitting resin, an addition ratio based on a color of a phosphor may be as follows: an amount of the green-based phosphor is larger than an amount of the red-based phosphor, and an amount of the yellow-based phosphor is larger than an amount of the green-based phosphor.

A YAG of a garnet-based phosphor or an oxynitride-based phosphor may be used as the yellow-based phosphor. A silicate-based phosphor or an oxynitride-based phosphor may be used as the green-based phosphor, and a nitride-based phosphor may be used as the red-based phosphor.

In addition to the mixing of various types of phosphors with the light-transmitting resin, a layer having a red-based phosphor, a layer having a green-based phosphor, and a layer having a yellow-based phosphor may be separately configured.

The control module 130 controls the overall operation of the lighting device 100. The control module 130 is inserted into the receiving recess of the heat dissipating frame 110. The control module 130 includes a second substrate 131, a power supply element 132, a communication element 133, and a plurality of connecting terminals 134.

The second substrate 131 is a support substrate which supports the power supply element 132 and the communication element 133.

The second substrate 131 may be a substrate in which a circuit pattern is printed on an insulator. For example, the second substrate 131 may include a general PCB, a metal core PCB, a flexible PCB, a ceramic PCB, and the like.

The second substrate 131 is inserted into the receiving recess of the heat dissipating frame 110 in a state of being disposed vertically upright. That is, the power supply element 132 and the communication element 133 are attached to the second substrate 131. When the power supply element 132 and the communication element 133 are disposed vertically upright, an air flow is generated in a vertical direction within the heat dissipating frame 10 by a convection phenomenon, and thus, heat dissipation characteristics of the lighting device 100 can be improved as compared with a case where the power supply element 132 and the communication element 133 are disposed horizontally.

The power supply element 132 and the communication element 133 are attached to the second substrate 131.

The power supply element 132 is connected to the power input terminal 153 of the inner case 150. Accordingly, driving power is supplied to the communication element 133 by using AC power supplied through the power input terminal 153.

Also, the power supply element 132 supplies driving power through the connecting terminal 134 to the light source 123 or the light source control element 122 attached on the first substrate 121.

The communication element 133 is connected to the antenna 124 provided in the light source module 120. Accordingly, the communication element 133 receives a wireless control signal through the antenna 124 and outputs a control signal for controlling the light source 123, based on the received wireless control signal.

The light distribution cover 140 is coupled on the heat dissipating frame 110.

The light distribution cover 140 has a bulb shape and the inner surface of the light distribution cover 140 is coated with an ivory white paint. The paint may include a diffusing agent so that light passing through the light distribution cover 140 is diffused in the inner surface of the light distribution cover 140.

The light distribution cover 140 may be made of glass, but there is a problem that the glass is vulnerable to a weight or external impact. Thus, it is preferable that the light distribution cover 140 is made of plastic, polypropylene (PP), polyethylene (PE), or the like. More preferably, the heat dissipating frame 110 may be made of polycarbonate (PC) for light diffusion, which has excellent light resistance, heat resistance, and impact strength characteristics.

A surface roughness of the inner surface of the light distribution cover 140 may be greater than a surface roughness of the outer surface of the light distribution cover 140. That is, when light generated by the light source 123 is irradiated on the inner surface of the light distribution cover 140 and is emitted to the outside, the light irradiated on the inner surface of the light distribution cover 140 can be sufficiently scattered and diffused and then emitted to the outside. The inner surface and the outer surface of light distribution cover 140 are formed to have the surface roughness satisfying the above-mentioned characteristics, the light emission characteristics can be improved.

Also, it is preferable that the light distribution cover 140 is formed through blow molding among molding methods, so as to widen the orientation angle of light.

The inner case 150 receives the control module 130. A receiving hole 151 is formed in the inner case 150. That is, the inner case 150 receives the control module 130 through the receiving hole 151. The inner case 150 may be formed to have a cylindrical shape. The inner case 150 can prevent electrical short between the control module 130 and the heat dissipating frame 110. The inner case 150 may be made of a material having excellent insulation and durability. Also, the inner case 150 may be made of a resin material.

On the inner surface of the inner case 150, an insertion recess projects in a direction of the receiving hole 151 of the inner case 150, that is, in an inward direction of the inner case 150.

The insertion recess guides the control module 130 to be inserted vertically upright into the receiving hole 151 of the inner case 150.

That is, the control module 130 is inserted into the insertion recess and is inserted into the receiving hole 161 of the inner case 150. In a state in which the control module 130 is inserted, the surface of the control module 130 comes into contact with the insertion recess and is supported by the insertion recess.

The inner case 150 includes the power input terminal 153. The inner case 150 is connected to an external power supply through the power input terminal 153. The power input terminal 153 may be connected to the external power supply by using a socket method. Also, the power input terminal 153 may be connected to the external power supply. That is, the power input terminal 153 may be electrically connected to the external power supply. In addition, the power input terminal 152 may electrically connect the control module 130 (more specifically, the power supply element 132 included in the control module 130) to the external power supply. The power input terminal 153 may be made of a conductive material.

The feeding cover 160 seals the inner case 150. The feeding cover 160 covers the receiving hole 151 of the inner case 150 from below. The feeding cover 160 comes into contact with the external power supply. The feeding cover 160 electrically connects the control module 130 to the external power supply. The feeding cover 160 may be made of a conductive material.

Hereinafter, the control module 130, the light source module 120, and the assembled structure thereof will be described in detail.

Figure 3:
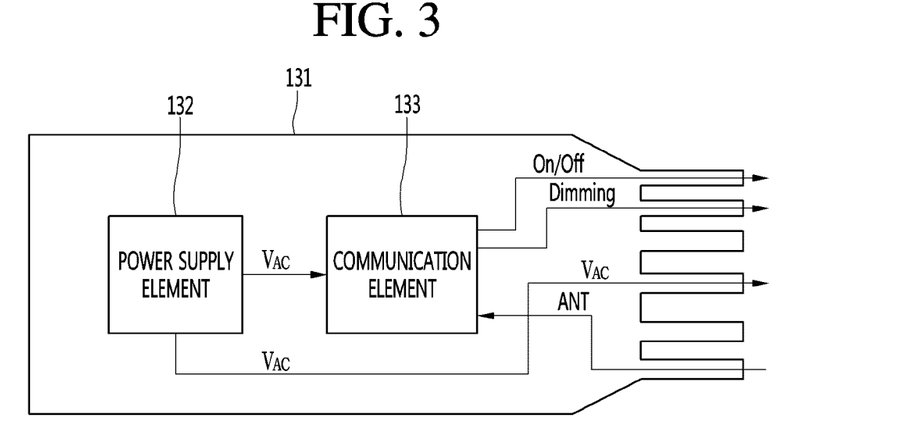
FIGS. 3 and 4 are detailed configuration diagrams of a control module 130 illustrated in FIG. 1.
Figure 4:
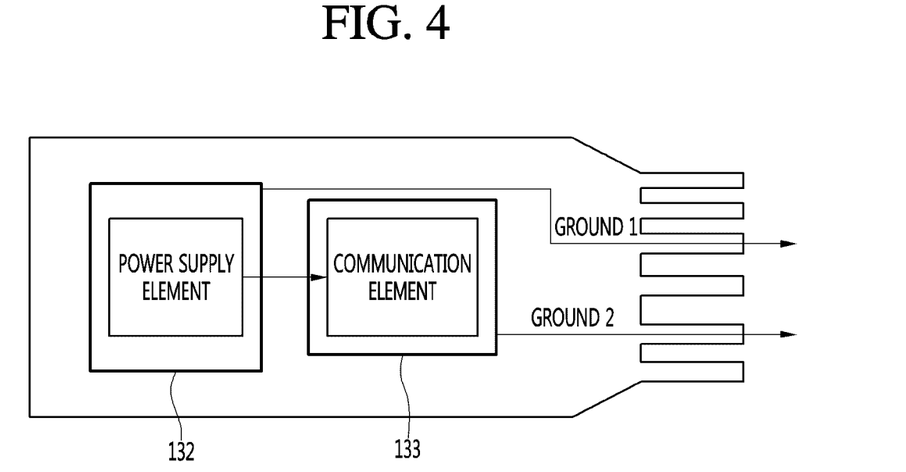
Figure 5:
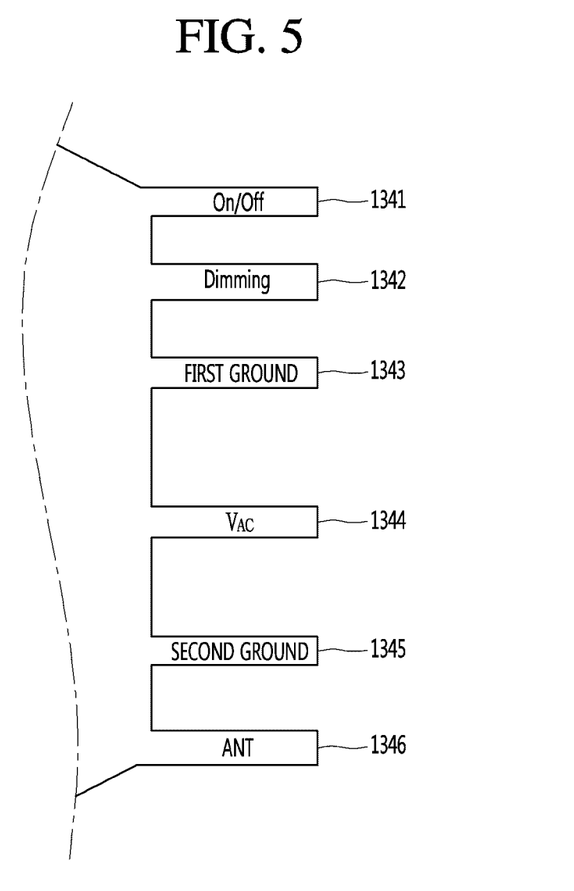
FIG. 5 is a diagram illustrating an arrangement structure of connecting terminals 134 of the control module 130.
Figure 6:
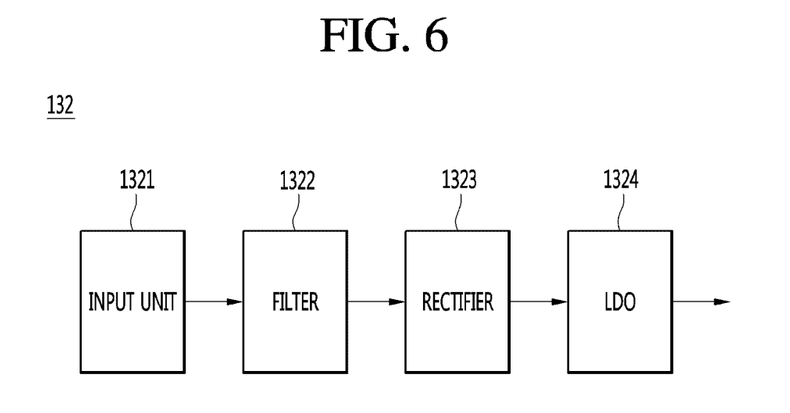
FIG. 6 is a detailed configuration diagram of a power supply element 132 included in the control module 130.

FIGS. 3 and 4 are detailed configuration diagrams of the control module 130 illustrated in FIG. 1, FIG. 5 is a diagram illustrating an arrangement structure of the connecting terminals 134 of the control module 130, and FIG. 6 is a detailed configuration diagram of the power supply element 132 included in the control module 130.

Referring to FIGS. 3 to 6, the control module 130 includes the second substrate 131 having an approximately plate shape.

The control module 130 includes the power supply element 132 and the communication element 133 on the second substrate 131. The power supply element 132 receives power, converts the received power, and supplies driving power to each component. The communication element 133 receives a wireless control signal transmitted from the outside and outputs a control signal for controlling the light source 123.

The power supply element 132 may include an input unit 1321, a filter 1322, a rectifier 1323, and a low drop output (LDO) 1324.

The input unit 1321 supplies commercial AC power inputted from the outside and outputs the commercial AC power to the filter 1322. Although not illustrated, the input unit 1321 may include a first input terminal receiving power having positive characteristics, and a second input terminal receiving power having negative characteristics.

The filter 1322 filters the AC power inputted through the input unit 1321. Preferably, the filter 1322 may include at least one inductor for removing harmonic waves included in the AC power.

The rectifier 1323 rectifies the AC power passing through the filter 1322 into DC power.

The rectifier 1323 may include a bridge diode rectifier circuit. As the rectifier 1323, various rectifier circuits for rectifying AC power into DC power may be used. These various rectifier circuits fall within the scope of the present invention. The DC power rectified through the rectifier 1323 has 0 V at 0 degree, 70.7% of the maximum power level at 45 degrees, and 100% of the maximum power level at 90 degrees.

The power rectified through the rectifier 1323 is supplied to the LDO 1324 and is also supplied to the light source 123 provided in the light source module 120 through the connecting terminal 134.

Accordingly, the AC power is rectified into the DC power, and the rectified DC power is directly supplied to the light source 123, instead of supplying power converted into DC power having a constant level through a switch mode power supply (SMPS). Thus, the light source 123 is driven by an AC direct drive method.

The LDO 1324 converts the DC power outputted through the rectifier 1323 into power for driving the communication element 133.

Also, the LDO 1324 outputs power having a specific level (e.g., 8 V) for outputting a pulse width modulation for dimming control of the light source 123.

The power supply element 132 is connected to the connecting terminal 134 and supplies the rectified power to the light source module 120.

The communication element 133 is arranged above the second substrate 131 in a region spaced apart from the power supply element 132 by a predetermined distance. The communication element 133 receives a wireless control signal through the antenna 124 and outputs a control signal for controlling the light source 123, based on the received wireless control signal.

The communication element 133 is connected to the connecting terminal 134, and receives the wireless control signal or outputs the control signal for controlling the light source 123.

A plurality of connecting terminals 134 is provided in the second substrate 131.

The connecting terminal 134 has a pin shape projecting from one side surface of the second substrate 131 in a lengthwise direction of the second substrate 131.

One end of the connecting terminal 134 is connected to the power supply element 132, the communication element 133, and the ground patterns (which will be described below), and the other end of the connecting terminal 134 is connected to the light source control element 122, the light source 123, the antenna 1234, and the ground patterns (which will be described below) provided in the light source module 120.

Six connecting terminals 134 may be provided, but the present invention is not limited. The number of connecting terminals 134 may increase.

Each of the plurality of connecting terminals 134 projects in a lengthwise direction of the second substrate 131 in a state of being spaced apart from the side surface of the second substrate 131 by a predetermined distance.

The connecting terminal 134 includes a first connecting terminal 1341, a second connecting terminal 1342, a third connecting terminal 1343, a fourth connecting terminal 1344, a fifth connecting terminal 1345, and a sixth connecting terminal 1346.

The first connecting terminal 1341 is connected to the communication element 133 provided on the second substrate 131. In particular, the first connecting terminal 1341 is connected to a power signal output port (not illustrated) of the communication element 133.

That is, the communication element 133 generates a control signal for a power control (ON/OFF) of the light source 123, based on a wireless transmission signal transmitted from the outside, and outputs the generated control signal through the first connecting terminal 1341.

The second connecting terminal 1342 is connected to the communication element 133 provided on the second substrate 131. In particular, the second connecting terminal 1342 is connected to a dimming signal output port (not illustrated) of the communication element 133.

That is, the communication element 133 generates a control signal for a dimming control of the light source 123, based on a wireless transmission signal transmitted from the outside, and outputs the generated control signal through the second connecting terminal 1342.

The third connecting terminal 1343 is connected to a first ground pattern 135 formed on the second substrate 131. Also, the fifth connecting terminal 1345 is connected to a second ground pattern 136 formed on the second substrate 131.

That is, the first ground pattern 135 and the second ground pattern 136 are formed on the second substrate 131.

The first ground pattern 135 is a pattern for a ground of the power supply element 132, and the second ground pattern 136 is a pattern for a ground of the communication element 133.

The power supply element 132 and the communication element 133 are respectively grounded by the separate ground patterns. Therefore, the power supply element 132 and the communication element 133 may be separated and insulated from each other on the second substrate 131 by the first ground pattern 135 and the second ground pattern 136.

Also, due to the separation and isolation of the power supply element 132 and the communication element 133, interference caused by the mutual operations can be minimized.

The fourth connecting terminal 1344 is connected to the power supply element 132 provided on the second substrate 131.

That is, the power supply element 132 is connected to the fourth connecting terminal 1344 and outputs driving power for driving the light source module 120 through the fourth connecting terminal 1344.

The sixth connecting terminal 1346 is connected to the communication element 133. That is, the sixth connecting terminal 1346 is connected to a signal transmission and reception port of the communication element 133 (or a component which manages signal transmission and reception).

Therefore, the communication element 133 may receive a wireless control signal transmitted from the outside through the sixth connecting terminal 1346, and may transmit a wireless signal to an external communication device (not illustrated) through the sixth connecting terminal 1346.

The connecting terminal 134 is formed on one side of the second substrate 131. At this time, the communication element 133 is formed in a region adjacent to the connecting terminal 134. This is done for improving signal transmission and reception characteristics by minimizing a distance between the communication element 133 and the antenna 124.

Also, the sixth connecting terminal 1346 connected to the signal transmission and reception port of the communication element 133 is arranged in an outermost region among the plurality of connecting terminals. This is done for preventing operations performed by other connecting terminals from affecting the signal transmission and reception operation.

The performance of the signal transmission and reception function can be maximized by connecting the second ground pattern 136 to the fifth connecting terminal 1345 adjacent to the sixth connecting terminal 1346 performing the signal transmission and reception function.

The control module 130 is disposed vertically upright within the heat dissipating frame 110 and the inner case 150 such that the connecting terminals 134 constituting the control module 130 face upward.

The connecting terminals 134 disposed to face upward are inserted into the insertion holes 112 formed in the heat dissipating frame 110 and the coupling holes 126 formed in the light source module 120.

Figure 7:
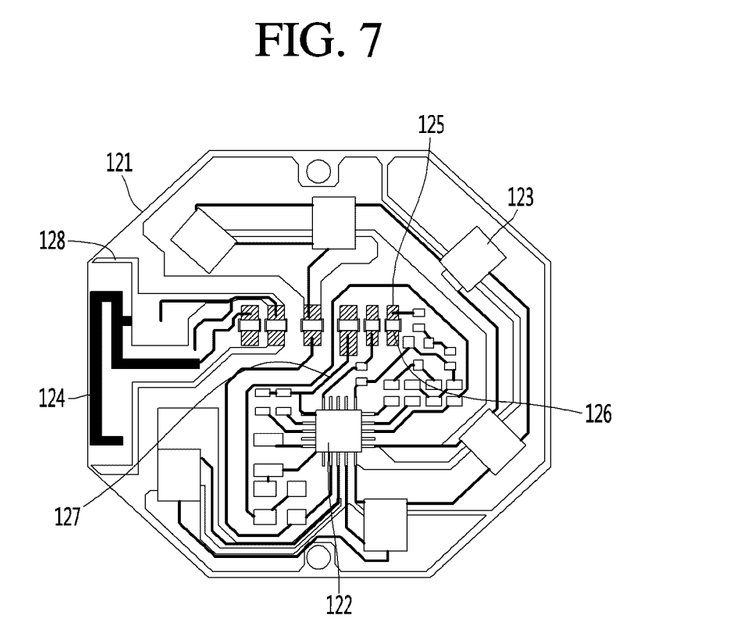
FIG. 7 is a detailed configuration diagram of a light source module 120 illustrated in FIG. 1.
Figure 8:
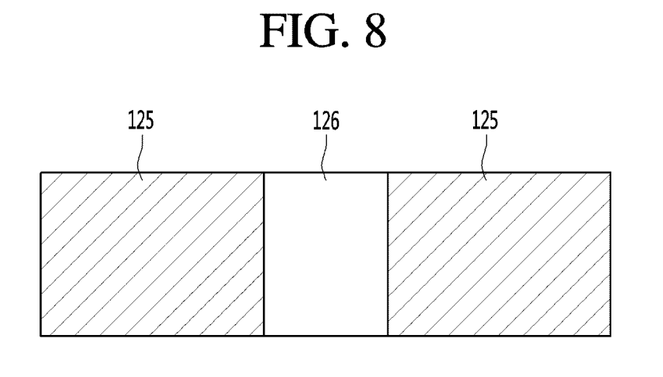
FIG. 8 is a detailed configuration diagram of a pad illustrated in FIG. 7.

FIG. 7 is a detailed configuration diagram of the light source module 120 illustrated in FIG. 1, and FIG. 8 is a detailed configuration diagram of the pad illustrated in FIG. 7.

Referring to FIGS. 7 and 8, the light source module 120 includes the first substrate 121, the light source control element 122, the light source 123, the antenna 124, the plurality of pads 125, the plurality of coupling holes 126, the first ground pattern 127, and the second ground pattern 128.

The first substrate 121 is a support substrate as described above and may have an octagonal shape as illustrated in FIG. 7.

The light source 123 and the antenna 124 are arranged at the edge portion of the first substrate 121.

The antenna 124 is formed by printing a conductive material on the first substrate 121.

The light source control element 122 may be arranged in a central region of the upper surface of the first substrate 121, except for the edge region where the light source 123 and the antenna 124 are arranged.

One coupling hole 126 and one pad 125 surrounding the periphery of the one coupling hole 126 may constitute one coupling part (not illustrated).

Accordingly, a total of six coupling parts are formed in the first substrate 121.

The six coupling parts are respectively connected to the six connecting terminals 134 formed in the second substrate 131. The coupling parts may be arranged in a row.

As illustrated in FIG. 7, the coupling parts may be referred to as a first coupling part, a second coupling part, a third coupling part, a fourth coupling part, a fifth coupling part, and a sixth coupling part in sequence from the rightmost coupling part.

The first coupling part includes one coupling hole 126 and the pad 125 surrounding the periphery of the one coupling hole 126. The first connecting terminal 1341 formed in the second substrate 131 is inserted into the coupling hole 126 constituting the first coupling part. Also, the pad constituting the first coupling part is electrically connected to the first connecting terminal 1341 inserted into the coupling hole 126 constituting the first coupling part.

The second coupling part includes one coupling hole 126 and one pad 125 surrounding the periphery of the one coupling hole 126. The second connecting terminal 1342 formed in the second substrate 131 is inserted into the coupling hole 126 constituting the second coupling part. Also, the pad constituting the second coupling part is electrically connected to the second connecting terminal 1342 inserted into the coupling hole 126 constituting the second coupling part.

The third coupling part includes one coupling hole 126 and one pad 125 surrounding the periphery of the one coupling hole 126. The third connecting terminal 1343 formed in the second substrate 131 is inserted into the coupling hole 126 constituting the third coupling part. Also, the pad constituting the third coupling part is electrically connected to the third connecting terminal 1343 inserted into the coupling hole 126 constituting the third coupling part.

The fourth coupling part includes one coupling hole 126 and one pad 125 surrounding the periphery of the one coupling hole 126. The fourth connecting terminal 1344 formed in the second substrate 131 is inserted into the coupling hole 126 constituting the fourth coupling part. Also, the pad constituting the fourth coupling part is electrically connected to the fourth connecting terminal 1344 inserted into the coupling hole 126 constituting the fourth coupling part.

The fifth coupling part includes one coupling hole 126 and one pad 125 surrounding the periphery of the one coupling hole 126. The fifth connecting terminal 1345 formed in the second substrate 131 is inserted into the coupling hole 126 constituting the fifth coupling part. Also, the pad constituting the fifth coupling part is electrically connected to the fifth connecting terminal 1345 inserted into the coupling hole 126 constituting the fifth coupling part.

The sixth coupling part includes one coupling hole 126 and one pad 125 surrounding the periphery of the one coupling hole 126. The sixth connecting terminal 1346 formed in the second substrate 131 is inserted into the coupling hole 126 constituting the sixth coupling part. Also, the pad constituting the sixth coupling part is electrically connected to the sixth connecting terminal 1346 inserted into the coupling hole 126 constituting the sixth coupling part.

The first coupling part is connected to the light source control element 122. Preferably, the first coupling part is connected to a port for reception of a power control signal among signal reception ports included in the light source control element 122.

Accordingly, the light source control element 122 receives the power control signal, which is transferred from the communication element 133 to the first connecting terminal 1341, through the first coupling part.

The second coupling part is connected to the light source control element 122. Preferably, the second coupling part is connected to a port for reception of a dimming control signal among signal reception ports included in the light source control element 122.

Accordingly, the light source control element 122 receives the dimming control signal, which is transferred from the communication element 133 to the first connecting terminal 1341, through the second coupling part.

The third coupling part is connected to the first ground pattern 127 formed on the first substrate 121. The first ground pattern 127 is provided for the ground of the light source control element 122 and/or the light source 123 formed on the first substrate 121. The third connecting part is connected to the third connecting terminal 1343, and the third connecting terminal 1343 is connected to the first ground pattern 135 formed on the second substrate 131.

Accordingly, the first ground pattern 127 formed on the first substrate 121 and the first ground pattern 135 formed on the second substrate 131 are connected to each other through the third coupling part.

The fourth connecting part is connected to the light source 123, and thus, the driving power $V_{AC}$ transferred through the fourth connecting terminal 1344 is supplied to the light source 123.

The fifth coupling part is connected to the second ground pattern 128 formed on the first substrate 121. The second ground pattern 128 is provided for the ground of the antenna formed on the first substrate 121.

The antenna 124 formed on the first substrate 121 is separated and insulated from the light source control element 122 and the light source 123 by the second ground pattern 128, thereby improving the signal transmission and reception performance of the antenna 124.

The fifth connecting part is connected to the fifth connecting terminal 1345, and the fifth connecting terminal 1345 is connected to the second ground pattern 136 formed on the second substrate 131.

Accordingly, the second ground pattern 128 formed on the first substrate 121 and the second ground pattern 136 formed on the second substrate 131 are connected to each other through the fifth coupling part.

The sixth coupling part is connected to the antenna 124 formed on the first substrate 121. Accordingly, the antenna 124 receives a wireless control signal from the outside and outputs the received wireless control signal through the sixth connecting terminal 1346 connected to the sixth coupling part, or wirelessly transmits the signal transferred through the communication element 133 to an external communication device.

Figure 9:
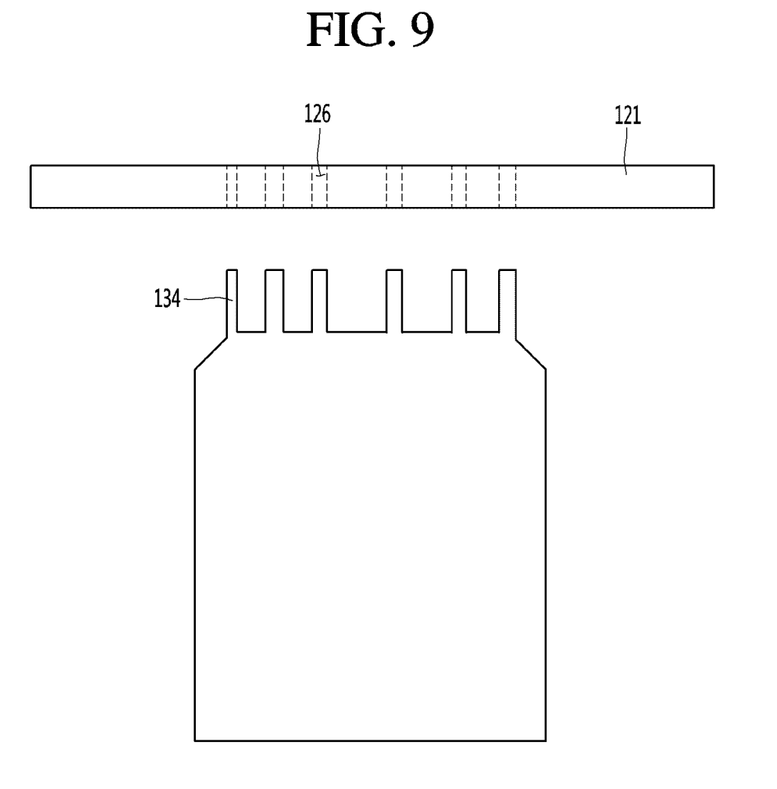
FIGS. 9 and 10 are diagrams for describing a coupled structure of the light source module 120 and the control module 130.
Figure 10:
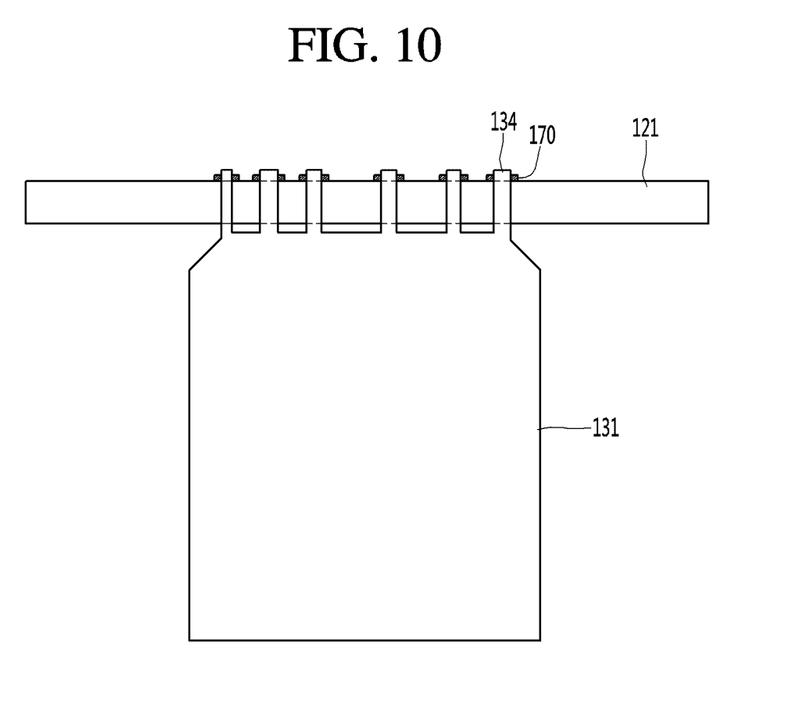

FIGS. 9 and 10 are diagrams for describing a coupled structure of the light source module 120 and the control module 130.

Referring to FIG. 9, the light source module 120 is disposed such that the upper surface of the first substrate 121 faces upward. The upper surface of the first substrate 121 may mean a region where the light source control element 122, the light source 123, and the antenna 124 are formed.

The control module 130 is disposed under the light source module 120. At this time, the control module 130 is disposed vertically upright such that the connecting terminals 134 face upward.

The plurality of coupling holes 126 is formed in the light source module 120, and the connecting terminals 134 respectively corresponding to the plurality of coupling holes 126 are formed in the control module 130.

Referring to FIG. 10, the connecting terminals 134 included in the control module 130 disposed vertically upright are inserted into the corresponding coupling holes 126 of the light source module 120.

The pads 125 are respectively formed around the coupling holes 126.

Subsequently, in a state in which the connecting terminals 134 are inserted into the coupling holes 126, a coupling process is performed to couple the pads 125 and the connecting terminals 134.

The coupling process may be performed by forming a separate adhesive member 170 between the pads 125 and the connecting terminals 134 projecting through the coupling holes 126 of the light source module 120 and fixing the connecting terminals 134 on the first substrate 121 by using the adhesive member 170.

As the adhesive member 170, a solder may be used.

Since the lighting device according to the embodiments of the present invention can receive the wireless control signal through the antenna and control the light source according to the wireless control signal, the wireless control of the lighting device can be achieved, thereby improving convenience of the user of the lighting device.

Also, in the embodiments of the present invention, the upper substrate and the lower substrate can be connected to each other, without additional connection members, by forming the holes on the pads connected to various elements in the substrate and inserting the terminals formed in the lower substrate into the formed holes. Therefore, the signal transmission is performed in a shortest distance, thereby minimizing signal loss.

Also, in the embodiments of the present invention, the ground pattern of the communication element which performs the communication function is separated and insulated from the ground pattern of the power supply element which performs the supply of power or the power control function, thereby minimizing interference occurring between the communication function and the power supply function.

Additionally, although various embodiments of the present invention have been particularly shown and described, the present invention is not limited to the above-mentioned specific embodiments and it should be understood by those skilled in the art that various modified embodiments are possible without departing from the technical idea and outlook of the present invention.

The invention claimed is:

1. A lighting device comprising:
   a heat dissipating frame having a receiving recess formed therein and a plurality of insertion holes formed in an upper surface thereof;
   a light source module disposed on the upper surface of the heat dissipating frame, and including a first substrate in which a plurality of coupling holes is formed at positions facing the plurality of insertion holes; and
   a control module received in the receiving recess of the heat dissipating frame, and including a second substrate having a plurality of connecting terminals formed on a side surface thereof and projecting in a lengthwise direction,
   wherein the control module is disposed vertically upright within the receiving recess such that the plurality of connecting terminals faces upward, and the plurality of connecting terminals is inserted in the plurality of insertion holes and the plurality of coupling holes and is connected to the light source module,
   wherein the light source module comprises:
     at least one light source attached on the first substrate;
     a light source control element attached on the first substrate to control the at least one light source; and
     an antenna printed on the first substrate to receive a wireless control signal transmitted from the outside,
   wherein the control module comprises:
     a power supply element attached on the second substrate; and
     a communication element attached on the second substrate, and
   wherein the connecting terminals comprise:
     a control signal terminal connected to the communication element and the light source control element;
     an antenna connecting terminal connected to the antenna and the communication element;
     a power supply terminal connected the power supply element and the light source;
     a first ground connecting terminal for ground of the communication element and the antenna; and
     a second ground connecting terminal for ground of the power supply element, the light source and the light source control element,
   wherein the first ground connecting terminal is interposed between the control signal terminal and the power supply terminal,
   wherein the second ground connecting terminal is interposed between the power supply terminal and the antenna connecting terminal, and
   wherein the control signal terminal and the antenna connecting terminal are arranged in an outermost region, respectively.

2. The lighting device of claim 1, further comprising, on the second substrate:
   a first ground pattern for ground of the power supply element; and
   a second ground pattern insulated from the first ground pattern for ground of the communication element,
   wherein the first and second ground patterns are respectively connected the second ground connecting terminal and the first ground connecting terminal.

3. The lighting device of claim 2, wherein the light source module further comprises:

a third ground pattern formed on the first substrate for ground of the light source control element and the light source; and a fourth ground pattern formed on the first substrate to be insulated from the third ground pattern for ground of the antenna, wherein the first ground connecting terminal connects the second ground pattern formed on the second substrate and the fourth ground pattern formed on the first substrate, and wherein the second ground connecting terminal connects the first ground pattern formed on the second substrate and the third ground pattern formed on the first substrate.

4. The lighting device of claim 3, wherein the first ground connecting terminal is arranged adjacent to the antenna connecting terminal arranged at the outermost region.

5. The lighting device of claim 4, wherein the control signal terminal comprises:

a power control signal terminal through which a power control signal of the light source supplied through the communication element attached on the second substrate is transferred to the light source control element attached on the first substrate; and a dimming control signal terminal through which a dimming control signal of the light source supplied through the communication element attached on the second substrate is transferred to the light source control element attached on the first substrate.

6. The lighting device of claim 5, wherein the light source module further comprises a plurality of pads formed around the plurality of coupling holes of the first substrate, and
wherein the pads comprise:

a first pad connected to the control signal terminal;

a second pad connected to the antenna connecting terminal;

a third pad connected to the power supply terminal;

a fourth pad connected to the first ground connecting terminal; and a fifth pad connected to the second ground connecting terminal.

7. A lighting device comprising:

a light distribution cover configured to emit light;

a heat dissipating frame coupled to a lower periphery of the light distribution cover and having a receiving recess in a flat upper surface and an inner surface thereof;

a light source module arranged on the upper surface of the heat dissipating frame;

an inner case received in a receiving recess of the heat dissipating frame;

a control module connected to the inside of the inner case and electrically connected to the light source module; and a socket part connected to a lower portion of the heat dissipating frame to supply power to the control module, the light source module comprises:
a first substrate;
at least one light source attached on the first substrate;
a light source control element attached on the first substrate;

an antenna printed on the first substrate;

a first ground pattern formed on the first substrate for ground of the light source and the light source control element; and a second ground pattern insulated from the first ground pattern and formed on the first substrate for ground of the antenna, the control module comprises:
a second substrate;
a power supply element attached on the second substrate and connected to the socket part;
a communication element attached on the second substrate;
a third ground pattern formed on the second substrate for ground of the power supply element; and
a fourth ground pattern insulated from the third ground pattern and formed on the second substrate for ground of the communication element, the first ground pattern is connected to the third ground pattern, and the second ground pattern is connected to the fourth ground pattern, wherein the control module comprises a plurality of connecting terminals formed on a side surface of the second substrate and projecting in a lengthwise direction, wherein the connecting terminals comprise:
a control signal terminal connected to the communication element and the light source control element;
an antenna connecting terminal connected to the antenna and the communication element;
a power supply terminal connected to the power supply element and the light source;
a first ground connecting terminal connecting the second ground pattern to the fourth ground pattern; and
a second ground connecting terminal connecting the first ground pattern to the third ground pattern, wherein the first ground connecting terminal is interposed between the control signal terminal and the power supply terminal, wherein the second ground connecting terminal is interposed between the power supply terminal and the antenna connecting terminal, and wherein the control signal terminal and the antenna connecting terminal are arranged in an outermost region, respectively.

8. The lighting device of claim 7, wherein the light source module further comprises:

a plurality of pads formed around a plurality of coupling holes of the first substrate, and
wherein the pads comprise:
a first pad connected to the control signal terminal;
a second pad connected to the antenna connecting terminal;
a third pad connected to the power supply terminal;
a fourth pad connected to the first ground connecting terminal; and
a fifth pad connected to the second ground connecting terminal.

* * * * *